United States Patent [19]
Bailey et al.

[11] 3,990,228
[45] Nov. 9, 1976

[54] METHOD AND APPARATUS FOR CONVERTING HEAT ENERGY INTO MECHANICAL ENERGY

[75] Inventors: Leo L. Bailey, Lake Worth; David R. Kimmel, Lantana, both of Fla.

[73] Assignee: Bailey and Kimmel, Inc., Lake Worth, Fla.

[22] Filed: Sept. 30, 1974

[21] Appl. No.: 510,569

[52] U.S. Cl. .............................. 60/39.02; 123/19; 60/39.34
[51] Int. Cl.² ........................................ F02C 3/14
[58] Field of Search ............... 60/39.05, 39.34, 624, 60/39.02, 39.35; 123/19

[56] References Cited
UNITED STATES PATENTS

| | | | |
|---|---|---|---|
| 1,206,001 | 11/1916 | Kohl | 123/19 |
| 1,336,392 | 4/1920 | Smith | 123/19 |
| 1,924,421 | 8/1933 | Stauber | 60/624 |
| 3,121,311 | 2/1964 | Crosby | 60/39.34 |

Primary Examiner—Carlton R. Croyle
Assistant Examiner—L. J. Casaregola
Attorney, Agent, or Firm—Cushman, Darby & Cushman

[57] ABSTRACT

A method of converting heat energy into mechanical energy in which two substantially symmetrical, cylindrical chambers are secured together and rotated about a common central axis with a liquid being maintained against the outer wall of either chamber by centrifugal force. A plurality of turbine type blades are secured to a shaft for rotation about the same axis as the chambers but independently thereof and in alignment with openings in both chambers. With a liquid being maintained in one chamber, a fuel mixture is injected into that chamber and ignited so as to expel the liquid against the blades to cause rotation thereof. The blades are shaped so that the expelled liquid will be directed into the corresponding opening in the other chamber and the gases in the first chamber are then expelled and the sequence repeated in the opposite direction, from the second mentioned chamber to the first.

6 Claims, 2 Drawing Figures

METHOD AND APPARATUS FOR CONVERTING HEAT ENERGY INTO MECHANICAL ENERGY

BACKGROUND OF THE INVENTION

This invention relates to method and apparatus for conversion of heat energy into mechanical energy and more particularly to an engine and method which will accomplish this in a continuous manner.

As we have discussed in our co-pending application (Ser. No. 491,128 filed July 23, 1974) there are certain disadvantages associated with prior art devices and methods of converting heat energy into mechanical energy in apparatus of the type that utilize a fuel expansion process wherein the expanded fuel itself is used as the main motivating force and is usually directed against an impeller, such as a turbine rotor blade, to produce useful work. The inherent disadvantage in such systems is basically that a substantial amount of the energy available in the expanded fuel can not be utilized efficiently to produce useful mechanical work since the energy is lost for various reasons including inability to direct the entire flow of the expanded fuel against impellers, premature exhausting of the fuel before the majority of useful energy has been extracted, and mechanical inefficiencies associated with many of the complicated prior art apparatus used to convert heat energy into mechanical energy in such a manner.

SUMMARY OF THE INVENTION

The present invention overcomes the above-described difficulties and disadvantages by utilizing a combined fuel and liquid system wherein, basically, the fuel is an ignitable mixture which expands rapidly upon ignition, the expansion of which is utilized to impart inertial energy to the liquid which in turn is directed against the blade of a turbine rotor or the like. The apparatus is preferably designed so that the same liquid may be reused by the system.

This is essentially accomplished in the present invention by the utilization of a method of continuously converting heat energy into mechanical energy in which a liquid is maintained in a first portion of a first chamber adjacent an opening defined therein and disposed so as to present a surface to seal off from the opening a second portion of the chamber, remote from the opening. Injected into the second portion of the chamber is an ignitable fuel mixture, injected so as to be in contact with the surface of the liquid. The mixture is then ignited so as to expel the liquid through the opening due to action of the expansion of the ignited fuel mixture on the surface of the liquid. The liquid is then directed against the blades of a turbine-like rotor which is connected to a central rotating shaft from which power may be easily removed.

The liquid is then directed by the shape of the blades into a second chamber substantially the same as the first, through an opening in the chamber corresponding to the opening in the first chamber. The ignited mixture contained in the first chamber is then exhausted and the liquid accumulates in the second chamber in the same manner that it was initially maintained in the first chamber, i.e. so that it is adjacent the opening, and disposed so as to present a surface to seal off a portion of the second chamber, remote from the corresponding opening in which the fuel mixture is injected. Fuel mixture is then injected into this portion of the second chamber in the same manner as it was in the first so that it is again in contact with the surface of the liquid. The mixture is then ignited and in like manner to the occurrence in the first chamber, it expels the liquid through the corresponding opening. The liquid is then, as before, directed against the blades of the turbine-like rotor to continue to cause the rotor to rotate in the same direction as the previous motion was imparted. The liquid is then directed back into the first chamber through the opening and the ignited mixture is expelled from the second chamber to complete the cycle.

The method described above is best utilized in an apparatus containing two chambers, preferably, one superposed on a second, and secured for rotation about a central axis, each of the chambers having a portion defining an opening remote from the axis. The opening being so positioned that the liquid contained within the chamber and held against an outer wall by centrifugal force will be contained in the chamber presenting a surface of the liquid remote from the opening and sealing off a portion of the chamber remote from that opening. In addition, the opening must be in such a position that the liquid can be expelled by the application of pressure to the surface of the liquid, as previously mentioned. Each of the chambers also contains at least one valve means remote from the opening and the liquid, through which the fuel mixture can be injected.

Some means must be provided to cause these chambers to rotate so as to produce the centrifugal force necessary to maintain the liquid against the outer wall of either of the chambers. A plurality of turbine-like blades are mounted for rotation about the same central axis as the chambers, but mounted for rotation independent from the chambers. The blades are aligned with the openings in both of the chambers in such a manner that the liquid when expelled from either of the openings will impinge upon the turbine-like blades so as to cause rotation thereof which in turn causes rotation of the central shaft from which the useful work is taken off in a conventional manner.

A fuel mixture injection device of a conventional type is connected to the valves in both chambers so as to supply a fuel mixture to the chambers. Ignition means and a means for timing the ignition are also associated with each of the chambers. Also, it is necessary to have some type of exhaust system which, preferably includes the utilization of the openings in the chambers after the liquid has been expelled. The ignited fuel mixture can then be expelled through these openings around the turbine-like blades and, thus, into an exhaust system where it can be carried away from the chambers and exhausted.

DETAILED DESCRIPTION OF THE PREFERRED EMBODIMENT

Figure 1:
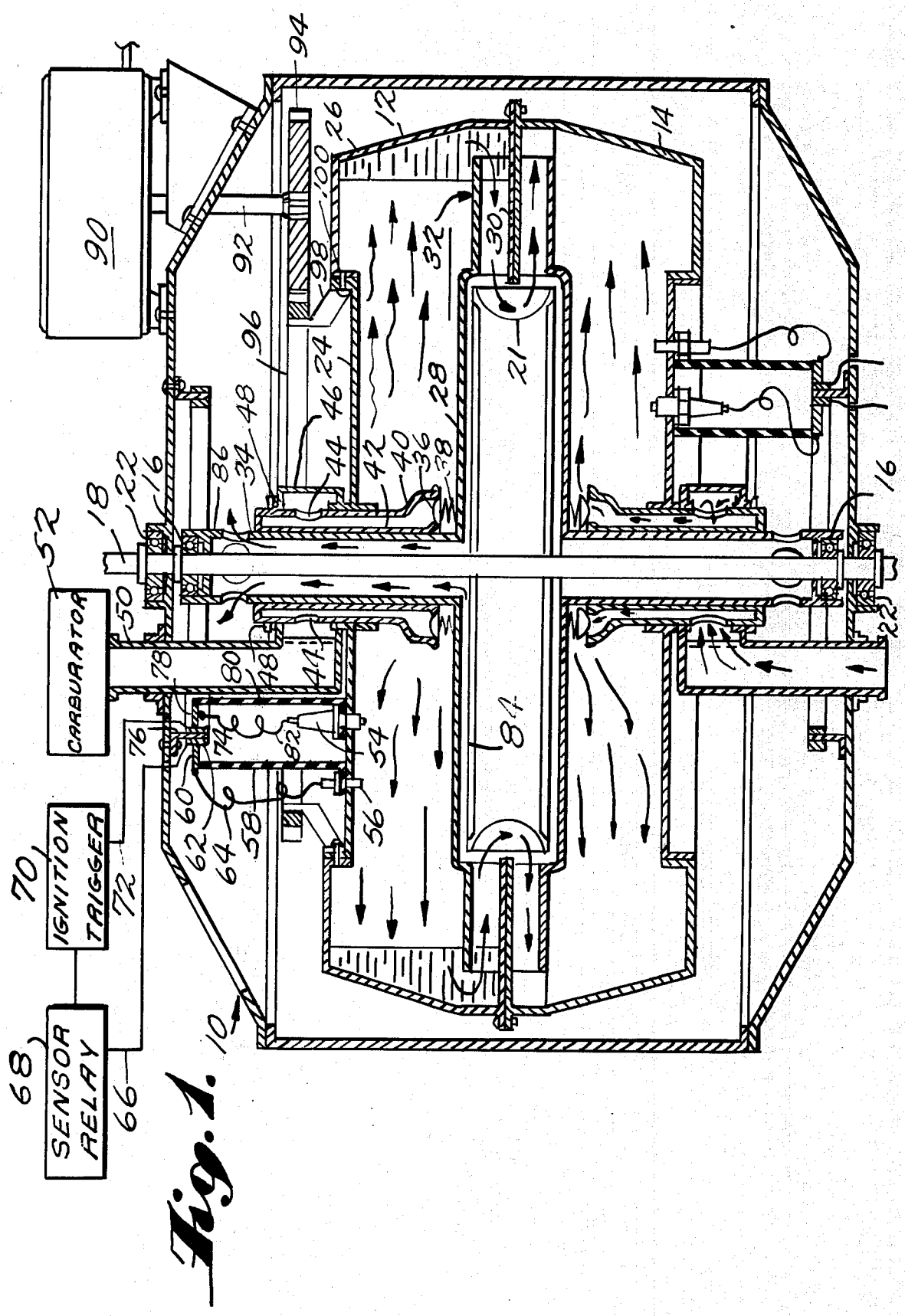
FIG. 1 is a side cross-sectional plan view of the preferred embodiment of the apparatus of the present invention.
Figure 2:
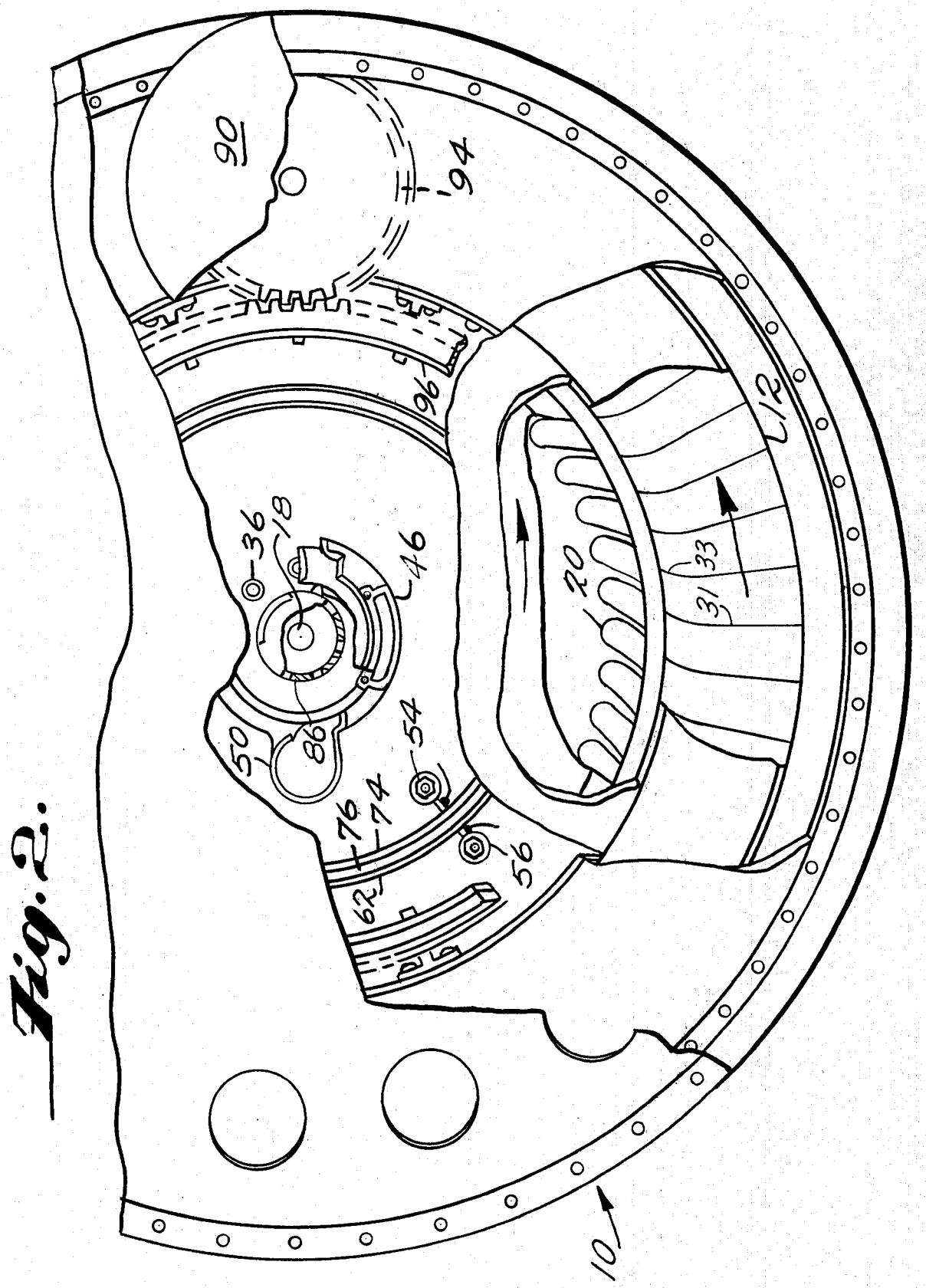
FIG. 2 is a partial top view in partial cross-section of the embodiment shown in FIG. 1.

The preferred embodiment of the invention is shown as being encased within a housing 10 to which the various components of the invention are secured or attached for rotation as the case may be. The basic components of the apparatus preferably comprise a first chamber 12, a second chamber 14, both of which are secured together and mounted for rotation to bearings 16, along with other components to be described below, mounted for rotation about shaft 18 but independently of rotation thereof. A plurality of turbine-type blades 20 are securely mounted to shaft 18 for rotation therewith in bearings 22.

Chambers 12 and 14 are preferably identical, thus, reducing the costs of production of the preferred embodiment, as well as aiding in maintaining the appropriate balance of the apparatus when it is rotating. In fact, with the exception of the portions of the apparatus utilized to produce the rotation of chambers 12 and 14, the entire preferred embodiment is substantially symmetrical about a plane passing between chambers 12 and 14 at the surfaces where they are connected perpendicular to shaft 18. In view of this symmetry, for the purposes of ease of explanation only, one side of the preferred embodiment, that being the upper side with respect to the imaginary plane, will be described with the understanding that the other portion of the apparatus below the imaginary plane is identical thereto.

Chamber 12 is preferably constructed with an upper wall portion 24, an outer wall portion 26, a lower wall portion 28 and an off-set portion 30 of the lower wall portion 28. Although walls 24 and 28 are shown in the preferred embodiment as being substantially parallel, it is apparent that these walls may either be converging or diverging outward from the central axis about which chamber 12 rotates. Portion 30 of wall 28 overlaps with portion 32 to produce an opening around the entire circumference of chamber 12 through which the liquid is expelled. The opening is further divided into a plurality of passageways defined by rectangular tubular-shaped members formed by a plurality of walls 31 which extend between wall portions 30 and 32. The walls 31 have their end portions 33 so designed as to enhance the effect of the force of the liquid flow leaving the passageways, on the blades 20.

The structure produced by overlapping portions 30 and 32 can be considered as creating compartments, one of which is the main body of the chamber and the other being the opening. Thus the two compartments are connected near the outermost portion of the chamber 12, adjacent wall 26 and the smaller compartment, i.e. the opening, extends inwardly toward shaft 18 and terminates adjacent outer portion 21 of blades 20.

The position of the outer edge of wall portion 32 with respect to outer wall 26 as well as the space between offset portions 30 and 32 being established based upon the viscosity of the liquid being expelled through the opening and the desired velocity and volume of expulsion. In other words, the efficiency of the apparatus is to a great extent dependent upon these critical dimensions which must be established based upon a particular liquid and mechanical arrangement being utilized. The determination of the appropriate dimensions can, at least preliminarily, be made from well known analytical and mathematical techniques for establishing flow rates, impulse, and torque requirements based upon the size of the apparatus. No attempt will be made to indicate particular parameters for these dimensions, since it will vary with a change in each of the parameters indicated above.

In any event, consideration must be made of the amount of liquid which will remain in the chamber 12 after expulsion of the majority of the liquid, since once the liquid level reaches a point below or outside the end of portion 32 the ignited fuel mixture, which will be at that time in the form of a gas, will escape around the edge of portion 32 leaving some liquid remaining in the chamber which may or may not be entirely expelled due to action of the gases on the surface thereof. If, for example, a high viscosity liquid is utilized it will most likely necessitate a greater opening between the outer most end of portion 32 and the outer wall 26 than would a low viscosity liquid. Thus, the amount of liquid remaining in the chamber would most likely be greater with a high viscosity liquid since the gas would begin escaping around the liquid sooner with the larger opening.

In the central portion of chamber 12 near inner wall 34 a valve mechanism is provided for permitting the fuel mixture to be injected into the chamber, consisting mainly of a valve 36 and a spring 38 for maintaining valve 36 in the port defined by walls 40 and 42. At least one of these valve mechanisms must be provided, however, as shown in the preferred embodiment, two are provided diametrically opposed to one another for the purpose of maintaining a balance. Naturally, the number and size of the valve means will be dependent upon the volume flow rate of fuel mixture required to fill the chamber 12 within the time period available between cycles of the apparatus as described below.

Wall portions 40 and 42 define a conduit which is in the form of a cylindrical cavity surrounding the central axis, and the walls are secured to chamber 12 for rotation therewith. A plurality of ports 44 are included in wall 40 which places the cylindrical cavity, beteen walls 40 and 42, in communication with a further cylindrical cavity formed by member 46, opening onto the openings 44. The member 46 is sealingly engaged with outer wall 40, but does not rotate therewith. It is sealed thereto preferably by means of O-rings 48 to prevent leakage of the fuel mixture. Member 46 is further in communication with a conduit 50 which leads directly to the carburetor mechanism 52. Carburetor 52 can be of any conventional type sufficient to provide the appropriate fuel mixture for combustion in chamber 12. The conduit 50 is secured to housing 10.

Secured to and extending through, preferably the upper wall 24 of chamber 12, are an ignition device 54 and a sensing device 56. The ignition device 54 is here shown as a conventional spark plug which may easily be utilized where the fuel mixture is a conventional petroleum/air mixture of a combustible nature. The sensor 56 is of a type sufficient to sense the ignitable quality of the fuel mixture contained within chamber 12. In other words, it should be sufficiently sensitive and of an appropriate type to determine that the fuel mixture within the chamber is of a sufficiently pure nature to support the combustion, and that, at least, a sufficient amount of the previously ignited fuel mixture has been expelled to prevent suppression of the ignition of the newly supplied fuel mixture.

One alternative means of connecting ignition device 54 and sensor 56 for having the time of ignition be dependent on the quality of fuel in the chamber is by having sensor 56 wired to an insulation post 58 which has a conductive end portion 60 that is in turn, in contact with a conductive rail 62 extending in a ring around the upper portion of the housing 10 so that as the chamber 12 rotates the contact portion 60 will remain in contact with the rail 62. Secured to contact 62 then, is wire 64 which conducts the sensing signal from sensor 56 to contact 60. The signal is then transmitted through rail 62, through wire 66, to the sensor instrumentation 68 which relays and translates the sensing signal into an electrical impulse transmitted to the ignition triggering device 70. From triggering device 70 the signal is transmitted through wire 72, conduit 74, similar to conduit 60, but insulated therefrom by the mounting posts 76, to a conductive end portion 78 of insulating post 80. The electrical impulse is thus supplied through wire 82 to the spark plug 54 which ignites the fuel mixture in the chamber. Another alternative, and in fact preferred, means of igniting the fuel mixture based upon the input of sensor 56 will however, be described below.

Once the liquid has been expelled from chamber 12 the ignited fuel mixture will then follow through the opening defined by end portions 30 and 32 of lower wall 28, due to the remaining pressure caused by its expansion. In so doing, it provides an advantageous means of exhausting chamber 12 so that a new quantity of fuel mixture may be injected for a subsequent cycle. In order to exhaust the fuel mixture to the outside, rather than have it follow the liquid into the chamber 14, a sufficient space has been provided between the lower wall 28 and the side 84 of the turbine blades 20. The ignited fuel mixture will then be expelled around the outer portions 84 of blades 20 towards the central axis where a further conduit is provided by the inner wall 34 of chamber 12 which extends upwardly and cylindrically around shaft 18 to provide an exhaust channel for the ignited fuel mixture to the outside via ports 86, from which point the exhaust gases may easily be directed out of the housing or channeled for treatment by pollution control apparatus, etc..

The one portion of the entire apparatus which is preferably not symmetrical, although it may well be if synchronization is utilized, is the drive means provided to rotate chambers 12 and 14 to create the centrifugal force which maintains the liquid against outer wall 26 of chamber 12 and the corresponding outer wall 88 of chamber 14. This drive mechanism is preferably an electric motor 90 secured to the upper portion of the housing with a drive shaft 92 extending through the housing and having a spur gear 94 attached to the drive shaft 92. The spur gear 94 is then in driving contact with ring gear 96 secured to upper wall 24 of chamber 12 in a plurality of positions by means of brackets 98 fastened to the upper wall 24, here shown by means of bolts 100. Motor 90 is preferably a variable speed electric motor whose speed of rotation may be controlled from a remote source to be able to adjust the speed of rotation of chambers 12 and 14 to obtain the appropriate amount of centrifugal force to maintain the liquid in the chambers.

Referring now to the preferred manner of providing a sensing and ignition timing sequence as mentioned above, since two chambers 12 and 14 are actually utilized to maintain a continuous operation of the cycle, it is preferable to time the sequence of operation of one based upon the corresponding portion of the sequence of operation of the other. In other words, it would not be desirable to ignite the fuel mixture in one chamber when the other chamber has not been fully evacuated or either the liquid or the ignited fuel mixture has not been expelled since this would result in the beginning of a cycle through what would otherwise have been a half cycle, or some other portion of a cycle, in the operation of the other chamber. In order to eliminate this possibility and to more easily control the sequence of operation of the cycles it is preferable to interrelate the ignition of spark plugs 54 and sensors 56 in opposite chambers. For example, if ignition device 54 in chamber 12 is connected to sensor device 56 in chamber 14, ignition of a new fuel mixture in chamber 12 will not occur until the sensor 56 in chamber 14 has determined that the previously ignited fuel mixture has been expelled and at least a portion of the new fuel mixture has been introduced into the chamber.

Using this preferred method of timing, when spark plug 54 in chamber 12 is ignited it will immediately cause the liquid to be forced into chamber 14 creating additional pressure in chamber 14 due to the decrease in volume. Because of the design of the valve mechanisms, and particularly the spring constant of spring 38, as previously mentioned, this increase in pressure will cause valve 36 to close, stopping further flow of fuel mixture into chamber 14. In this way the quantity of fuel to be introduced into a chamber may be regulated by the volume and pressure created in the chamber due to the presence of the liquid expelled from the other chamber. It is apparent that modifications of this timing sequence can be effectively utilized, for example, alternative valve means to valve 36 and spring 38 may be utilized where a predetermined quantity of fuel is injected into the chamber with sufficient pressure that it will not be dependent upon the presence of the liquid to reduce the volume a sufficient extent to create the pressure change necessary for the operation of the valve system described above. Thus, the timing of injection of the fuel could be dependent upon a sensing device in the chamber in which the fuel is to be injected, as is the case with the first alternative timing means indicated above, which sensing device could then indicate either the presence of the liquid or absence of the expelled previously ignited fuel mixture. Because of the possible combinations and permutations of the various means of timing the ignition in the chambers dependent upon conditions in that chamber or the opposing chamber, further examples will not be given but it is to be understood that they are considered to be available alternatives which may be preferable to that described dependent upon the particular environment in which the apparatus and method of the present invention are to be utilized.

The turbine-type blades 20 have their end portion 21 designed in a generally cup-shaped or hemispherical cross-section in the vertical plane so that the liquid is directed from the opening in one chamber to the opening in the other. The actual shape of end portion 21 may be designed for maximum torque effects on shaft 18, based on known designs in the art of turbine blades, however, provision must always be made for directing the flow of liquid from one opening to the other.

In order to understand the preferred method of the present invention, as well as the operation of the preferred embodiment, a description of a single cycle of operation of the preferred embodiment will now be explained. The operation will be explained with the understanding that at the beginning of the cycle the liquid is being maintained in chamber 12 against outer wall 26, the previously ignited fuel mixture in chamber 14 having been expelled and a new fuel mixture is being introduced into chamber 14. Using the preferred sensing and ignition interrelation described above, the sensor 56 in chamber 14 indicates that a fresh fuel mixture is present in chamber 14, thus, the sensor relay 68 to which it is connected, sends a signal to the ignition trigger mechanism 70 which in turn provides the voltage via contact ring 74 to contact portion 78 through wire 82 to ignition device 54 in chamber 12 where the fuel mixture present therein is ignited; the valve 36 in chamber 12 being closed to prevent backfire into the carburetion and conduit system. Upon ignition of the fuel mixture the rapid expansion thereof acting on the surface of the liquid forces it through the opening presented between portions 30 and 32 of outer wall 28 and directs the liquid flow against impeller blades 20 to cause rotation thereof. Due to the shape of impeller 20 the liquid is then directed to the opening in chamber 14. The liquid continues to accumulate in chamber 14 until the first half cycle of operation is completed by the expulsion from chamber 12 of all of the liquid which can be expelled therefrom which may or may not be all of the liquid in the chamber.

As the liquid begins to accumulate in chamber 14, the pressure therein builds up as a result of a decrease in volume, thus, the differential between the pressure on opposite sides of valve 36 in chamber 14 changes and based upon the predetermined spring constant, when the total amount of liquid available has accumulated in chamber 14 the volume will be such as to create a pressure sufficient to permit the spring 38 to close a valve 36 prohibiting further introduction of the fuel mixture into chamber 14. As the last portion of the liquid is being transferred from chamber 12 to chamber 14 the previously ignited fuel mixture present in chamber 12 will begin to flow through the opening created by portions 30 and 32 of wall 28 in chamber 14 and will be expelled into the space surrounding the turbine type blades as defined by the inner wall 28 and connected to the exhaust system to exhaust the gases. In addition, once the pressure begins to lower in chamber 12 due to the expulsion of the previously ignited gases, the pressure in the fuel injection conduits will become greater than the pressure in chamber 12 and, thus, valve 36 will be opened to permit the inflow of a fresh fuel mixture into chamber 12. Once the sensing device 56 in chamber 12 sends the appropriate signal to the sensor relay to indicate that a substantially ignitable quality of fuel mixture exists in chamber 12, a signal is sent to the ignition trigger 70 which then ignites spark plug 54 in chamber 14. This creates the same condition as occured in chamber 12, namely, upon expansion of the ignited fuel mixture the liquid is forced through the opening against the turbine blades 20 and is then directed back into the opening in chamber 12 where the sequence begins again.

Although the foregoing is a description of the preferred method and embodiment of the invention, it will be apparent to those skilled in the art that variations are possible. All such variations as would be obvious to one skilled in this art are intended to be within the scope of the invention as defined by the claims hereinafter.

What is claimed is:

1. A method of continuously converting heat energy into mechanical energy, comprising:
   maintaining a liquid in a first portion of a first chamber adjacent an opening defined therein, and disposed so as to present a surface to seal off from said opening a second portion of said chamber remote from said opening,
   injecting into said second portion of said chamber an ignitable fuel mixture so as to be in contact with said surface of said liquid,
   igniting said mixture so as to expel said liquid through said opening,
   directing said expelled liquid against at least one of a plurality of blades disposed for rotation about a central axis, so as to cause said blades to rotate,
   expelling said liquid from said blades and directing it into a second chamber substantially the same as said first chamber, by deflecting the flow of the liquid by means of said blades through an opening defined in said second chamber corresponding to said opening in said first chamber,
   exhausting said ignited mixture from said first chamber,
   maintaining said liquid in a first portion of said second chamber adjacent said corresponding opening therein and disposed so as to present a surface to seal off from said corresponding opening a second portion of said second chamber remote from said corresponding opening,
   injecting into said second portion of said second chamber an ignitable fuel mixture so as to be in contact with said surface of said liquid,
   igniting said mixture so as to expel said liquid through said corresponding opening,
   directing said expelled liquid against at least one of said plurality of blades so as to cause said blades to rotate in the same direction in which the previous motion was imparted,
   expelling said liquid from said blades and directing it back into said first chamber through said opening by means of said blades, and
   exhausting said ignited mixture from said second chamber, to complete said cycle;
   further, each step of maintaining the liquid in one of said chambers is accomplished by rotating said chambers about a common central axis so that centrifugal force maintains said liquid against an outer wall of either of said chambers, a portion of said chambers defining said openings extending inwardly toward said central axis and beyond the level of said maintained liquid so as to prevent escape of the liquid due to centrifugal force.

2. A method as defined in claim 1 wherein each said step of injecting said fuel mixture includes:
   premixing a fuel with air to produce said combustable mixture,
   introducing said mixture into one of said chambers through a closable valve remote from said opening and said liquid, and
   closing said valve when sufficient mixture has been injected to cause said liquid to be expelled when said mixture is ignited.

3. A method as defined in claim 2 wherein each said step of introducing said mixture includes:
   introducing a predetermined quantity of said mixture into said chamber, and
   closing said valve by means of sufficient pressure differential on opposite sides thereof.

4. A method of converting heat energy into mechanical energy, comprising:
   maintaining a liquid in a first portion of a first chamber adjacent an opening defined therein, and disposed so as to present a surface to seal off from said opening a second portion of said chamber remote from said opening,
   injecting into said second portion of said chamber an ignitable fuel mixture so as to be in contact with said surface of said liquid, igniting said mixture so as to expel said liquid through said opening, directing said expelled liquid against at least one of a plurality of blades disposed for rotation about a central axis, so as to cause said blades to rotate, expelling said liquid from said blades and directing it into a second chamber substantially the same as said first chamber, by deflecting the flow of the liquid by means of said blades through an opening defined in said second chamber corresponding to said opening in said first chamber, exhausting said ignited mixture from said first chamber, maintaining said liquid in a first portion of said second chamber adjacent said corresponding opening therein and disposed so as to present a surface to seal off from said corresponding opening a second portion of said second chamber remote from said corresponding opening, injecting into said second portion of said second chamber an ignitable fuel mixture so as to be in contact with said surface of said liquid, igniting said mixture so as to expel said liquid through said corresponding opening, directing said expelled liquid against at least one of said plurality of blades so as to cause said blades to rotate in the same direction in which the previous motion was imparted, and exhausting said ignited mixture from said second chamber;

further, each step of maintaining the liquid in one of said chambers is accomplished by rotating said chambers about a common central axis so that centrifugal force maintains said liquid against an outer wall of either of said chambers, a portion of said chambers defining said openings extending inwardly toward said central axis and beyond the level of said maintained liquid so as to prevent escape of the liquid due to centrifugal force.

5. A method as defined in claim 4 wherein each said step of injecting said fuel mixture includes:

premixing a fuel with air to produce said combustable mixture, introducing said mixture into one of said chambers through a closable valve remote from said opening and said liquid, and closing said valve when sufficient mixture has been injected to cause said liquid to be expelled when said mixture is ignited.

6. A method as defined in claim 5 wherein each said step of introducing said mixture includes:

introducing a predetermined quantity of said mixture into said chamber, and closing said valve by means of sufficient pressure differential on opposite sides thereof.

* * * * *